United States Patent
Kurashige et al.

(10) Patent No.: US 6,181,384 B1
(45) Date of Patent: Jan. 30, 2001

(54) IMAGE CONVERTING APPARATUS AND IMAGE CONVERTING METHOD

(75) Inventors: Masafumi Kurashige, Kanagawa; Osamu Watanabe, Tokyo; Kazumasa Ito, Tokyo; Teruyuki Nakahashi, Tokyo; Yuichi Hayatsu, Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 09/055,159

(22) Filed: Apr. 3, 1998

(30) Foreign Application Priority Data

Apr. 4, 1997 (JP) .................................................. 9-087037

(51) Int. Cl.$^7$ .............................. G06F 19/00; G09G 1/28
(52) U.S. Cl. ........................... 348/577; 348/576; 345/430
(58) Field of Search .................................. 348/578, 577; 345/430

(56) References Cited

U.S. PATENT DOCUMENTS

| | | | |
|---|---|---|---|
| 5,485,556 | * | 1/1996 | Takagi et al. ........................ 395/126 |
| 5,615,320 | * | 3/1997 | Lavendel ............................. 395/131 |
| 5,631,976 | * | 5/1997 | Bolle et al. .......................... 382/174 |
| 5,742,520 | * | 4/1998 | Uchikawa et al. ................... 364/526 |
| 5,777,689 | * | 7/1998 | Dunbar ............................... 348/625 |
| 5,999,185 | * | 12/1999 | Kato et al. .......................... 345/420 |

FOREIGN PATENT DOCUMENTS 0 817 469 A1   1/1996 (EP) ................................. H04N/1/60

OTHER PUBLICATIONS (Foley, van Dam, et al; Computer Graphics: Principles & Practice, 2nd Ed.; Chapter 16, Illumination & Shading), 1990.*

* cited by examiner

Primary Examiner—Andrew I. Faile
Assistant Examiner—Reuben M. Brown
(74) Attorney, Agent, or Firm—Philip M. Shaw, Jr.; Crosby, Heafey, Roach & May

(57) ABSTRACT

An image converting apparatus for converting an image of an input video signal into an image with a metallic luster and representing the metallic luster with parameters designated corresponding to the input image. The apparatus is based on the concept that a model of reflected light can represented with a model of reflected light of diffusion reflection and mirror-surface reflection and that even though the resultant model of reflected light is three-dimensional data, assuming that the brightness of an input video signal linearly varies, the model can be represented with brightness data. A color correction circuit 5 has a look-up table with which calculations for generating an image with a metallic luster are performed with the brightness data and the designated parameters. A matrix calculating circuit extracts a luminous signal component from the input video signal. A pre-modifying circuit adjusts the amplitude. The color correction circuit performs calculations for generating an image with a metallic luster. Mix circuits mix output signals of the color correction circuit with an input video signal.

18 Claims, 12 Drawing Sheets

→ HORIZONTAL
  DIRECTION

| COEFICIENT<br>MODE | $K_R$ | $K_G$ | $K_B$ |
|---|---|---|---|
| GOLD | 1.0 | 0.8 | 0.0 |
| SILVER | 0.8 | 0.8 | 1.0 |
| COPPER | 0.5 | 0.5 | 0.5 |
| OTHERS | any | any | any |

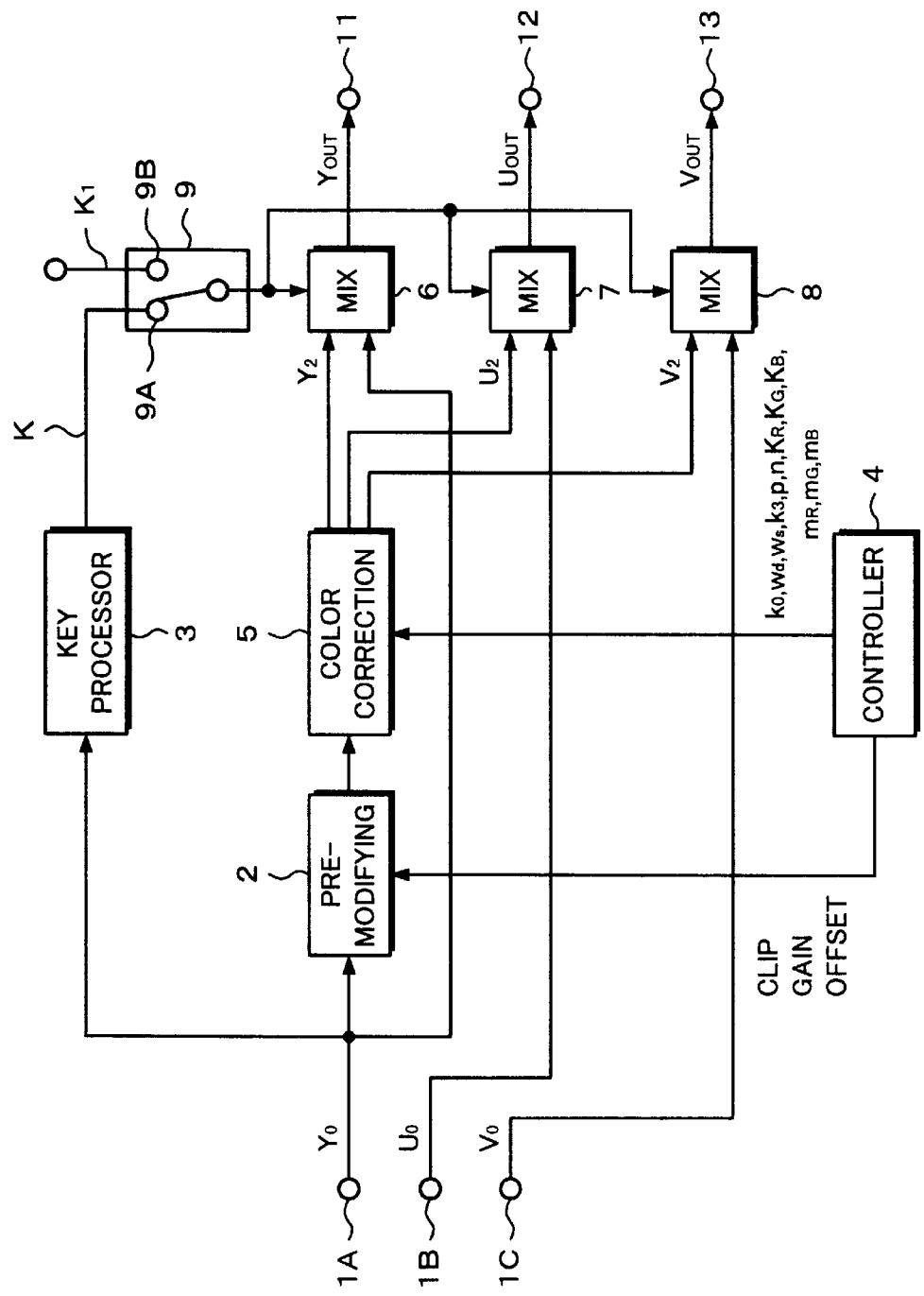

IMAGE CONVERTING APPARATUS AND IMAGE CONVERTING METHOD

BACKGROUND OF THE INVENTION

1. Field of the Invention

The present invention relates to an image converting apparatus suitable for a special effect image editing apparatus for performing various processes for an image of an input video signal, in particular, to an image converting apparatus for converting an input video image into an image with various metallic lusters.

2. Related Prior Art

A special effect image editing apparatus performs various processes for an image of an input video signal. Typical special effect processes performed by a conventional special effect editing image apparatus include enlarging an image, reducing an image, moving an image, rotating an image, emphasizing the contour of an image, shading off an image, color-inverting an image, and color- converting an image. Such a special effect image editing apparatus is used to generate an impressive image.

In addition, a special effect process for changing the texture of a substance is desired. In other words, assuming that there is a doll made of ceramic, even if the colors of the image of the doll are changed, the contour thereof is emphasized, or the image is shaded off, the texture of the ceramic is not substantially changed. When reflected light of a metal can be represented for such an image, the image of the doll made of ceramics can be converted into an image of a doll made of gold or silver. Thus, when a special effect process for changing the texture of a substance can be performed, an image that has a completely different impression from the original image can be reproduced. Consequently, a very interesting image can be generated.

A special effect process for converting an input image into an image with various metallic lusters requires calculations for the image conversion. It is necessary to analyze reflected light of the metal and perform calculations corresponding to the analyzed results. To do that, a model of reflected light for metallic lusters is created. With the model, the calculation process for generating metallic lusters is considered. However, a model of reflected light is represented in three dimensions. On the other hand, a conventional video signal is represented in two dimensions rather than three dimensions. Thus, it is difficult to perform a process for converting a video signal into an image with a metallic luster using the model of the conventional reflected light.

In addition, since there are various patterns as input images, even if the process for generating a metallic luster is performed for an input image, a proper effect may not take place. In addition, in the case that the variations in the brightness of the input image is small, the image may be equally colored. Thus, in this case, a metallic luster may not take place. In contrast, when the variations in the brightness of the input image is large, the resultant image glares and thereby appears as an unsmooth image. Consequently, when the input signal is a video signal, it should be processed corresponding to the pattern.

Therefore, an object of the present invention is to provide an image converting apparatus for converting an image of an input video signal into an image with a metallic luster and representing a metallic luster with parameters designated corresponding to the input image.

SUMMARY OF THE INVENTION

The above and other disadvantages of the prior art systems are overcome by the present invention of an image converting apparatus for converting an image of an input video signal into an image with a metallic luster, comprising a brightness signal extracting means for extracting a brightness signal component from the input video signal, a parameter designating means for designating parameters for converting the image, and a calculating means for performing calculations for generating a metallic luster for the image of the input video signal with the brightness signal extracted by the brightness signal extracting means and the parameters designated by the parameter designating means.

In the preferred embodiment the calculating means is composed of a look-up table. An amplitude designating means, disposed ahead of the calculating means in the signal processing, designates an amplitude characteristic of the input brightness signal supplied to the calculating means. A combining means, disposed after the calculating means in the signal processing, combines a video signal that has been image-converted by the calculating means and the input video signal corresponding to a key signal.

The present invention is furthermore an image converting method for converting an image of an input video signal into an image with a metallic luster, comprising the steps of extracting a brightness signal component from the input video signal, designating parameters for converting the image, and performing calculations for generating a metallic luster for the image of the input video signal with the brightness signal that has been extracted and the parameters that have been designated.

Generally, reflected light of an opaque substance is composed of diffusion reflected light and mirror-surface reflected light. With a model of reflected light of diffusion reflected light and mirror-surface reflected light, a model of reflected light of an opaque substance can be represented. Although the model of the reflected light is three-dimensional data, assuming that the brightness of the input video signal linearly varies, the model of the reflected light can be represented with brightness data. With a circuit that performs such calculations, a circuit that converts an input image into an image with a metallic luster can be accomplished.

When the circuit that performs such calculations is a look-up table, the circuit structure can be simplified. In addition, the process can be performed at high speed. Moreover, with parameters designated, an image of a substance with an optimum metallic luster can be reproduced on real-time basis.

When a pre-modifying circuit is disposed at an upstream stage from the circuit that performs the calculations, the dynamic range of a look-up table can be properly designated. In addition, with a key processor, a process for generating an image with a metallic luster can be performed when the brightness level exceeds a predetermined value.

The foregoing and other objectives, features and advantages of the invention will be more readily understood upon consideration of the following detailed description of certain preferred embodiments of the invention, taken in conjunction with the accompanying drawings.

BRIEF DESCRIPTION OF DRAWINGS

FIG. 14 is a block diagram showing an example of an image converting apparatus according to the present invention.

DESCRIPTION OF PREFERRED EMBODIMENTS

Next, with reference to the accompanying drawings, embodiments of the present invention will be described. The present invention is applied to an image converting apparatus for converting an image of an input video signal into an image with a metallic luster. It is considered that such an image converting apparatus analyzes a model of reflected light of a substance with a metallic luster, obtains a calculation equation for generating the metallic luster corresponding to the model, and performs a process for the input image corresponding to the input image.

First of all, the reflection of light from an opaque substance is analyzed and thereby a display model of a conventional opaque substance is created. When light emitted from a light source reaches the surface of a substance, the light is reflected on the surface and transmitted therefrom. The reflection of light from the source on the surface of the substance is generally categorized into diffusion reflection and mirror-surface reflection.

Diffusion reflection means a reflection in which incident light is repeatedly reflected and refracted on a layer of particles on the surface of the substance and thereby part of the light is emitted from the surface. Diffusion reflection takes place, for example, on the surface of chalk, rubber, or the like. On the other hand, a mirror-surface reflection means a reflection that takes place only on a shiny surface of a substance, as in a reflection from a mirror.

Figure 1:
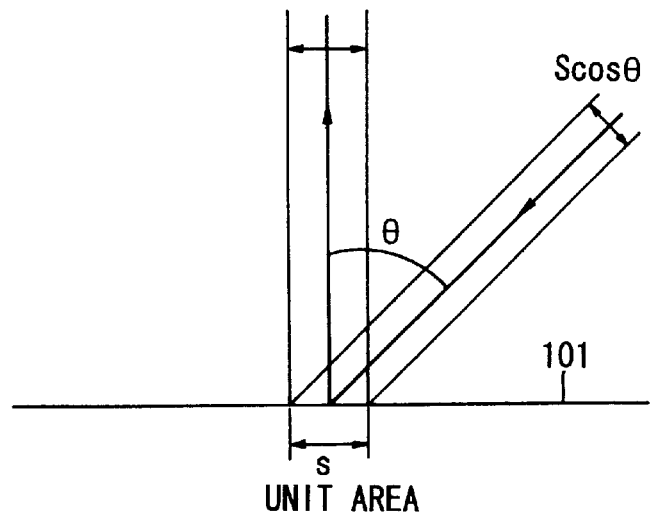
FIG. 1 is a schematic diagram for explaining diffusion reflection.

First, the diffusion reflection is analyzed. As described above, the diffusion reflection takes place when incident light is repeatedly reflected and refracted on a layer of particles on the surface of the substance and thereby part of the light is emitted from the surface. Such a diffusion reflection can be defined with the amount of energy of light. In other words, as shown in FIG. 1, the amount of energy of light that enters a unit area S of the surface of a substance 101 is proportional to cosine of the incident angle. With respect to the amount of light energy, assuming that the intensity of the incident light is represented by I, the intensity of the reflected light is represented by R, the reflection coefficient is represented by $w_d$, and the incident angle is represented by $\theta$, the diffusion reflection can be represented as follows:

$$R = w_d(\cos \theta) I \quad (1)$$

Figure 2:
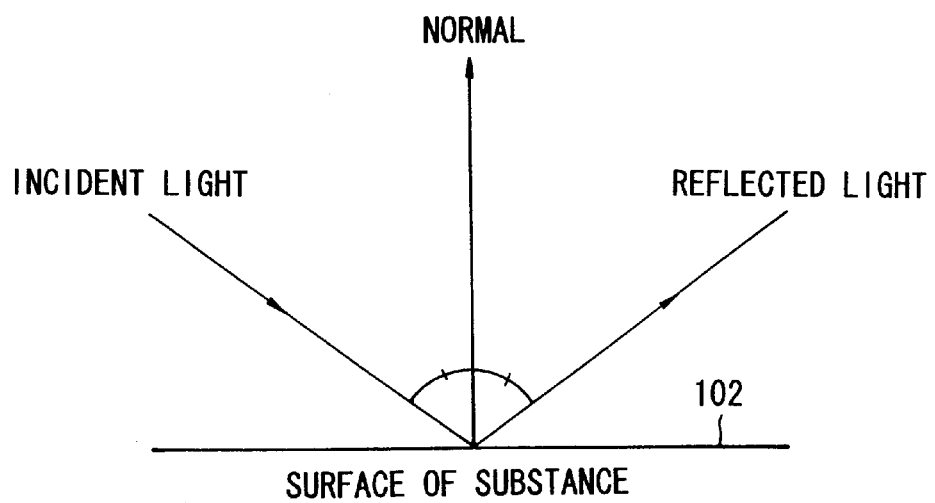
FIG. 2 is a schematic diagram for explaining mirror-surface reflection.
Figure 3:
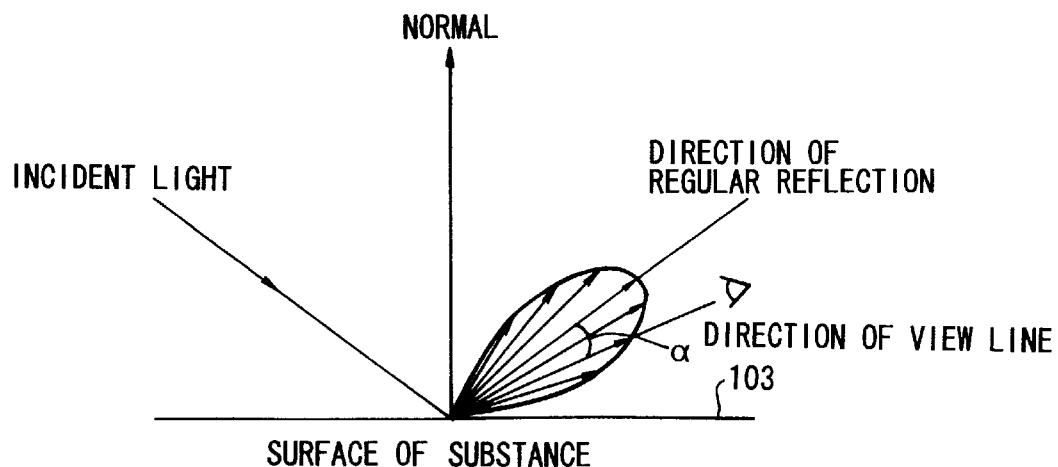
FIG. 3 is a schematic diagram for explaining mirror-surface reflection.

On the other hand, the mirror-surface reflection is a reflection that takes place only on the surface of a substance. As shown in FIG. 2, in the case of the mirror-surface reflection, incident light that reaches a substance 102 is reflected symmetrically with respect to the normal of the surface of the substance 102. Moreover, in the case of the mirror-surface reflection, light scatters and spreads due to a finely uneven surface. Thus, as shown in FIG. 3, in the case of the mirror-surface reflection, in addition to the direction of the regular reflection, incident light that reaches a substance 103 also reflects in the direction with an angle of $\alpha$ degrees to the direction of the regular reflection.

As described above, in the mirror-surface reflection, light reflects both in the direction of the regular reflection and the direction with the angle of $\alpha$ degrees thereto. The intensity of the reflected light is the strongest in the direction of the regular reflection. The intensity of the reflected light in the direction with the angle of $\alpha$ degrees to the direction of the regular reflection is attenuated by $(\cos \alpha)^n$. Thus, the mirror-surface reflection can be represented as follows:

$$R = w_s (\cos \alpha)^n I \quad (2)$$

where I is the intensity of the incident light, R is the intensity of the reflected light, Ws is the reflection coefficient, and $\alpha$ is the angle between the direction of the regular reflection and the direction of the view line.

As described above, on a general opaque substance, the diffusion reflection and mirror-surface reflection take place. The diffusion reflection and mirror-surface reflection can be represented by Equations (1) and (2), respectively. Thus, with Equations (1) and (2), a mode of reflected light of a general opaque substance can be created.

In the above description, the incident light is explained as simple light (brightness and darkness). However, light emitted from a light source has a particular spectrum. When light with a spectrum reflects on the surface of a substance, the reflected light has a spectrum of which a spectrum I ($\gamma$) of the incident light and a spectrum R ($\gamma$) of the reflected light are multiplied ($P(\gamma) = I(\gamma) R(\gamma)$).

Thus, considering colors, a display model of a general opaque substance can be represented as follows:

$$\begin{bmatrix} R \\ G \\ B \end{bmatrix} = (d_1 + W_d \cos\theta) \begin{bmatrix} R_0 \\ G_0 \\ B_0 \end{bmatrix} + (d_2 + W_1 (\cos\alpha)^n) \begin{bmatrix} R_1 \\ G_1 \\ B_1 \end{bmatrix} \quad (3)$$

[0029]

where (R, G, B) are colors of the reflected light, ($R_0$, $G_0$, $B_0$) are colors of the diffusion reflection, ($R_1$, $G_1$, $B_1$) are colors of the mirror-surface reflection, $d_1$ is the reflection coefficient of the diffusion reflection of the background light, $d_2$ is the reflection coefficient of the mirror-surface reflection of the background light, θ is the incident angle, α is the angle between the direction of the regular reflection of the mirror-surface reflection and the direction of the view line, $w_d$ is the coefficient of the diffusion reflection, and $w_s$ is the coefficient of the mirror-surface reflection. Thus, with the above-described equation, a model of a general opaque substance can be represented.

However, this model is represented in three dimensions. On the other hand, video data supplied to the image processing apparatus according to the present invention is two-dimensional data rather than data with three-dimensional coordinate values such as computer graphics. Thus, with the video data, it is impossible to three-dimensionally determine a substance.

With a high-speed image analyzing function that can convert two-dimensional video data into three-dimensional video data for one frame (for example, for 1/30 second in the NTSC system), the process for the above-described equation can be performed. In other words, with such a high-speed image analyzing function, a three-dimensional model of a substance can be created with two-dimensional image data. By determining the angle of the normal at each pixel of the substance, the calculating process corresponding to the above-described equation can be performed.

However, when such a high-speed image analyzing function is provided, the circuit scale increases and thereby the cost of the apparatus rises. Thus, such a function is not practical. However, without such a function, it is difficult to obtain the angle θ between the normal at each pixel of a three-dimensional substance and a light source and the angle α between the direction of the regular reflection and the direction of the view angle.

Thus, according to the present invention, the terms that represent the light of the diffusion reflection and mirror-surface reflection in Equation (3):

$$(d_1 + W_d(\cos\theta)) \begin{bmatrix} R_0 \\ G_0 \\ B_0 \end{bmatrix} \quad (4)$$

and $$(d_2 + W_s(\cos\alpha)^n) \begin{bmatrix} R_1 \\ G_1 \\ B_1 \end{bmatrix} \quad (5)$$

are obtained from the input brightness data as will be described later.

Figure 4:
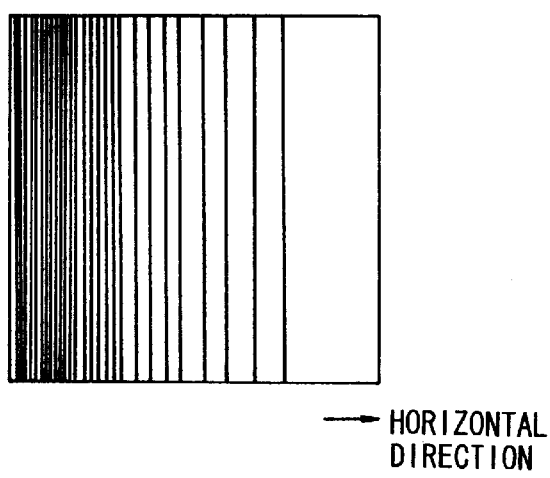
FIG. 4 is a schematic diagram for explaining the relation between brightness data and diffusion reflection.
Figure 5:
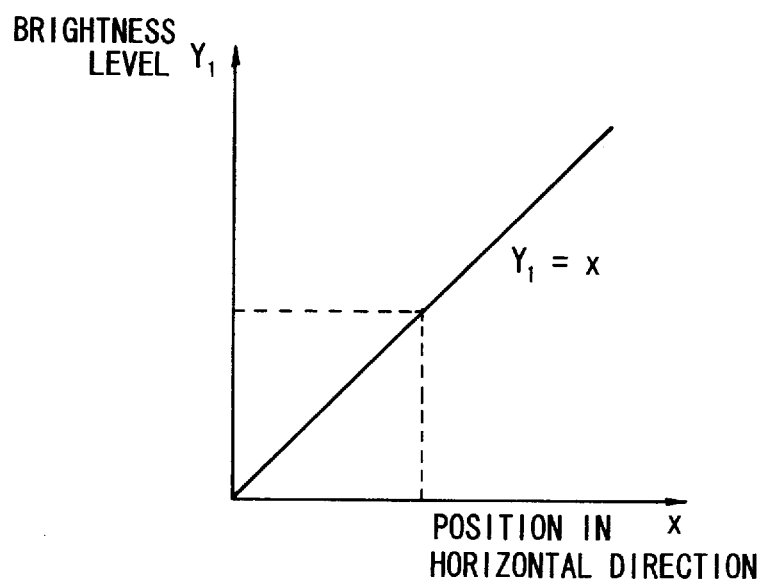
FIG. 5 is a graph for explaining the relation between brightness data and diffusion reflection.

As shown in FIG. 4, it is assumed that there is a local block whose brightness level linearly varies on a screen of one frame. In addition, it is assumed that in this block, the brightness level linearly varies corresponding to horizontal positions on a particular horizontal line. In other words, as shown in FIG. 5, it is assumed that in this block, the brightness level $Y_1$ linearly varies ($Y_1=x$) at the horizontal position x. This is because it can be considered that a general video signal is composed of a plurality of local blocks that have such properties. In FIG. 5, the horizontal axis represents the horizontal position, whereas the vertical axis represents the level of the brightness. Corresponding to such assumptions, the term ($d_1+w_d \cos θ$) of the diffusion reflection level in Equation (3) will be considered.

Figure 6:
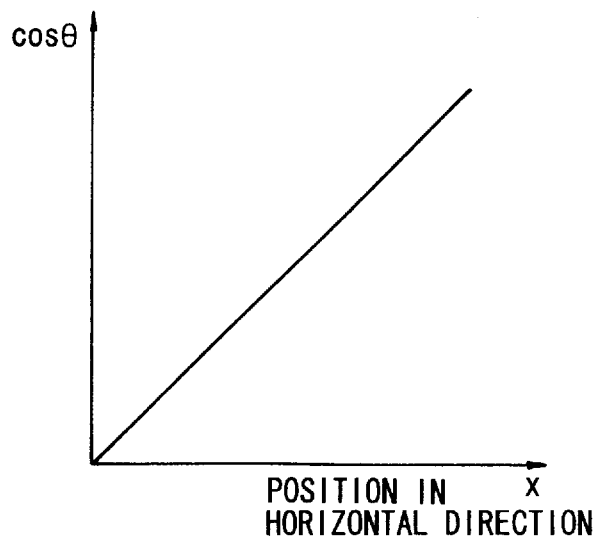
FIG. 6 is a graph for explaining the relation between brightness data and diffusion reflection.

As shown in FIG. 5, assuming that the level of the incident light linearly varies in the horizontal direction, the level of the diffusion reflection also linearly varies corresponding to horizontal positions with the incident brightness level as shown in FIG. 6. In other words, cos θ in the term of the diffusion reflection level linearly varies with the incident brightness level. Thus, cos θ can be represented as follows:

$$\cos\theta = k_1 \cdot x \quad (6)$$

$$= k_1 \cdot Y_1$$

where $k_1$ is a coefficient.

Next, a three-dimensional model of which the diffusion level linearly increases corresponding to horizontal positions will be considered.

Figure 7:
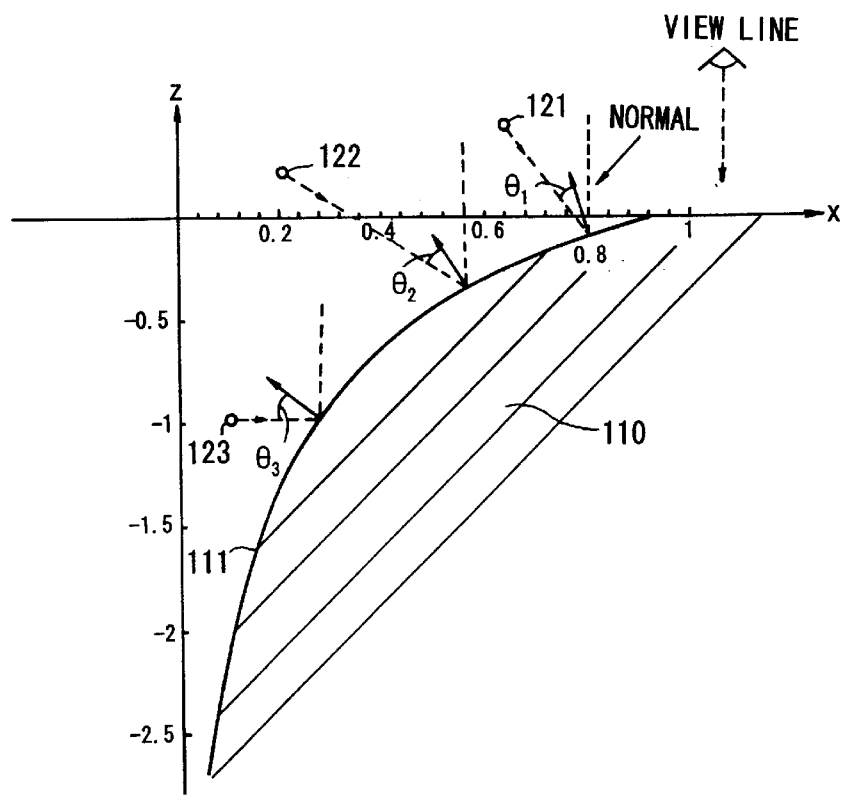
FIG. 7 is a graph for explaining the relation between brightness data and diffusion reflection.

FIG. 7 is a schematic diagram showing such a virtual substance represented in a three-dimensional orthogonal coordinate system. In FIG. 7, reference numeral 110 is a virtual substance. Reference numeral 111 is a reflection surface of the virtual substance. The x axis represents a horizontal position, the z axis represents a three-dimensional depth position, and the y axis extends downwardly on the drawing. Thus, in FIG. 7, the x-y plane is treated as a screen of a monitor. In addition, the direction of the view line is treated as the positive direction of the z axis. Light sources are disposed at x=0.80, x=0.56, and x=0.27. Rays of light are emitted from the light sources 121, 122, and 123 to the reflection surface 111 of the virtual substance 110.

Figure 8:
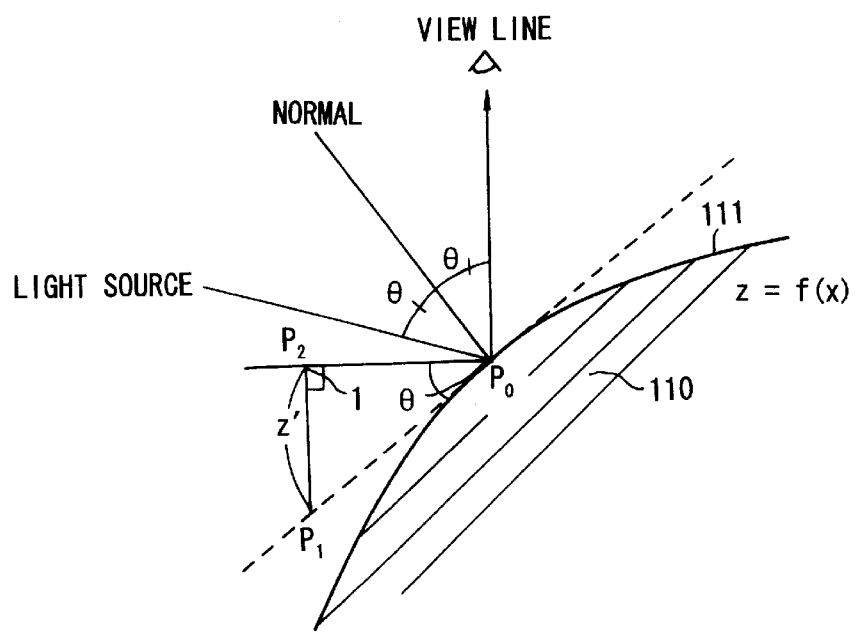
FIG. 8 is a graph for explaining the relation between brightness data and diffusion reflection.

Next, to consider only the diffusion reflection, in the mirror-surface reflection component in Equation (3), α is treated as a constant (α=0). In the mirror-surface reflection, α represents the angle between the direction of the regular reflection and the direction of the view line. Thus, the angle α does not relate to the diffusion reflection. Assuming that the angle α between the direction of the regular reflection and the direction of the view line is 0, incident angles $θ_1$, $θ_2$, and $θ_3$ of the light sources 121, 122, and 123 are obtained with Equation (3). A curve z=f(x) that represents the surface 111 of the virtual substance 110 can be considered as follows:

In reality, the curve z=f(x) can be obtained by considering a geometric relation shown in FIG. 8. As shown in FIG. 8, a light source and a view line are disposed. The normal of the substance 110 is placed between the light source and the view line, the angle between the light source and the normal and the angle between the view line and the normal being an angle θ, each. Thus, the relation between a slope z of a curve that represents the surface of the virtual substance (z'= differentiated value of (z)) and the incident angle θ is represented as follows:

$$\cos\theta = \frac{1}{\sqrt{1+(Z')^2}} \quad (7)$$

With Equations (6) and (7), the following equation:

$$\frac{1}{\sqrt{1+(Z')^2}} = K_1 \cdot x \quad (8)$$

is obtained.

When the above-described equation is solved with respect to z, an equation that represents the shape of the surface of a substance whose level of the diffusion reflection term linearly increases can be obtained:

$$Z = \int \sqrt{\left(\frac{1}{kx}\right)^2 - 1} \, dx \qquad (9)$$

$$= \int \frac{\sqrt{1-(kx)^2}}{kx} \, dx$$

$$= \frac{\sqrt{1-(kx)^2} + \log x - \log\left(k + k\sqrt{1-(kx)^2}\right)}{k}$$

As shown in FIG. 6, the curve represented by Equation (9) is applicable for a substance whose brightness level linearly varies corresponding to horizontal positions. In other words, as shown in FIG. 6, the brightness level of the diffusion reflection term reflected by a three-dimensional virtual substance with the surface represented by Equation (9) linearly varies corresponding to horizontal coordinate values.

Figure 9A:
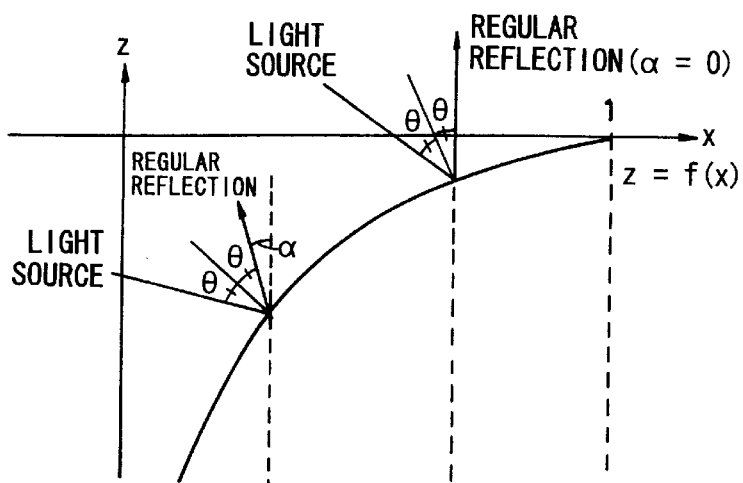
FIG. 9 is a graph for explaining the relation between brightness data and mirror-surface reflection.

Next, the mirror-surface reflection term $(d_2+w_s(\cos\alpha)^n)$ in Equation (3) will be considered. To consider only the mirror-surface reflection term, it is assumed that $\theta$ (reflection angle) of the diffusion reflection term in Equation (3) is constant. In other words, as shown in FIG. 9A, it is assumed that incident light enters with the constant angle $\theta$ to the tangent of the curve $z=f(x)$ regardless of the x coordinate value.

As represented by Equation (3), the mirror reflection level depends on the value of the cosine of the angle $\alpha$ between the direction of the regular reflection and the direction of the view line. Thus, with ($\alpha=0$), the mirror reflection level becomes the maximum. The mirror reflection level decreases corresponding to the angle $\alpha$. The condition ($\alpha=0$) is satisfied when the direction of the regular reflection matches the direction of the view line.

Figure 9B:
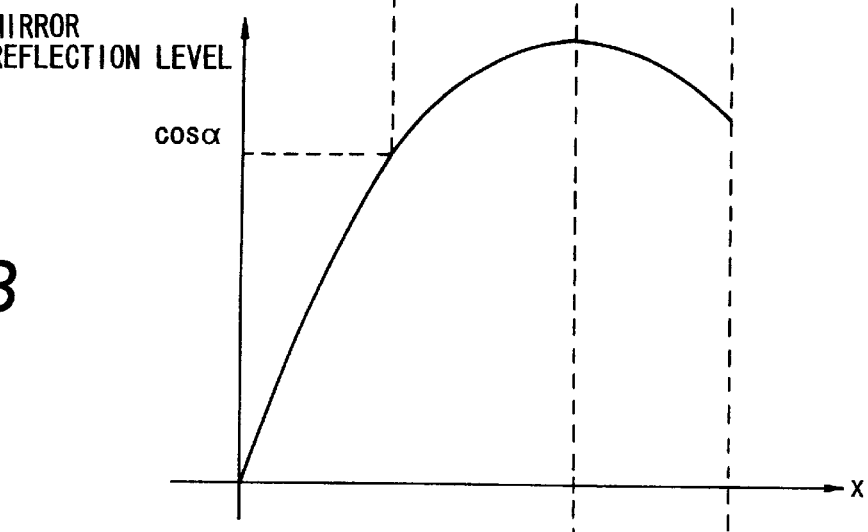
Figure 9C:
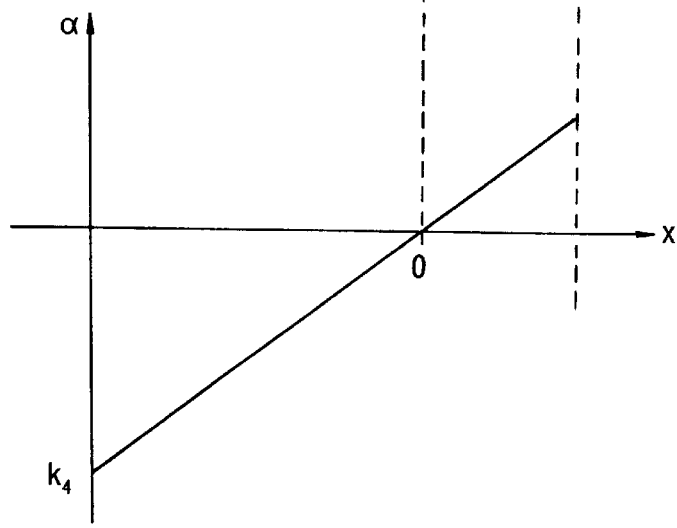

Since the decrease curve is defined by the reflection curve $z=f(x)$ represented by Equation (9), the decrease curve corresponds to a cosine curve. In other words, as shown in FIGS. 9B and 9C, there is a particular relation between the horizontal position x and the angle $\alpha$. Thus, the angle can be represented as follows:

$$\alpha = k_3 \cdot x + k_4 \qquad (10)$$

$$= k_3 \cdot Y_1 + k_4$$

where $k_3$ and $k_4$ are coefficients.

When Equation (10) is substituted into Equation (3), the following equation can be obtained:

$$r = [k_0 + w_d \cdot Y_1 + w_s \{\cos(k_3 \cdot Y_1 + k_4)\}^n] \cdot k_R$$

$$g = [k_0 + w_d \cdot Y_1 + w_s \{\cos(k_3 \cdot Y_1 + k_4)\}^n] \cdot k_G$$

$$b = [k_0 + w_d \cdot Y_1 + w_s \{\cos(k_3 \cdot Y_1 + k_4)\}^n] \cdot k_B \qquad (11)$$

where the coefficient $k_1$ is included in the coefficient $W_d$. Thus, when the circuit that operates corresponding to the above-described equation is accomplished, an input video signal can be converted into an image with a metallic luster.

Figure 10A:
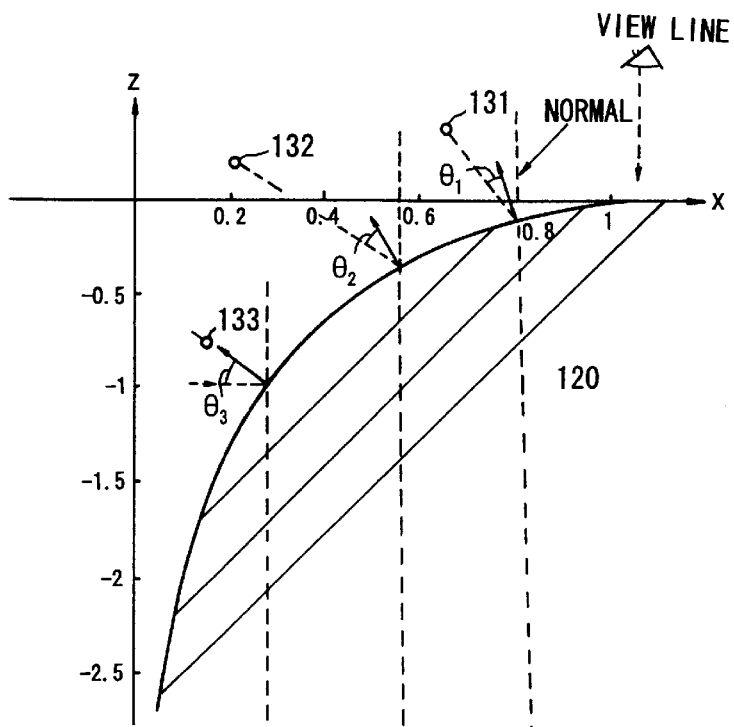
FIG. 10 is a graph for explaining the relation among brightness data, diffusion reflection, and mirror-surface reflection.
Figure 10B:
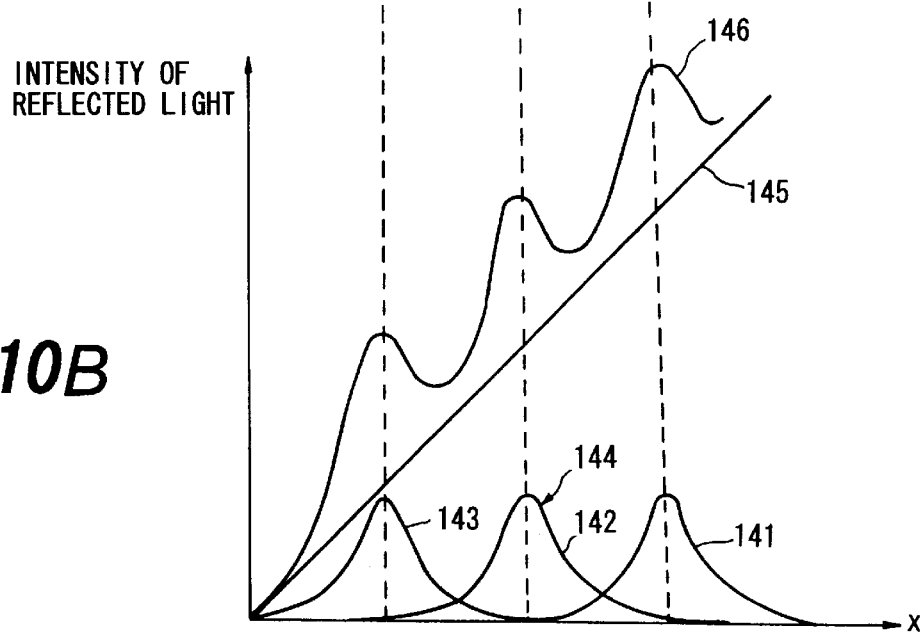

As described above, when the calculations corresponding to Equation (11) are performed, an image with a metallic luster is obtained. In other words, assuming a virtual substance 120 shown in FIG. 10A, the diffusion reflection level linearly varies and the brightness level also linearly varies. When rays of light of three light sources 131, 132, and 133 reach the virtual substance, as shown in FIG. 10B, the three light sources 131, 132, and 133 cause the mirror reflection levels to vary as represented by curves 141, 142, and 143, respectively. A combined curve 144 of the curves 141, 142, and 143 becomes a mirror-surface reflection curve. The diffusion reflection light linearly varies as represented by a straight line 145. Thus, a combined curve 146 of the curve 144 and the straight line 145 represents the combination of the diffusion reflection and the mirror-surface reflection.

Figures 11, 13:
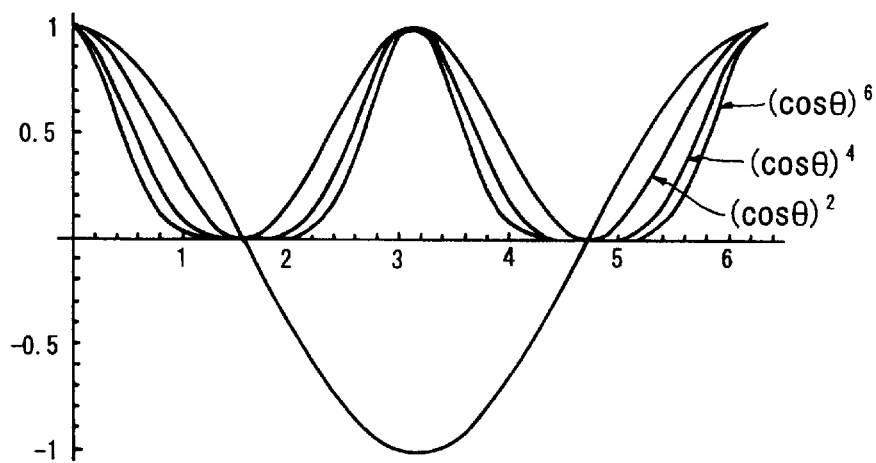
FIG. 11 is a schematic diagram for explaining parameters.
FIG. 13 is a schematic diagram for explaining parameters.

The image converting apparatus according to the present invention performs calculations corresponding to the following equation:

$$r = [k_0 + w_d \cdot Y_1 + w_s \{\cos(k_3 \cdot Y_1 + p + m_R)\}^n] \cdot k_R$$

$$g = [k_0 + w_d \cdot Y_1 + w_s \{\cos(k_3 \cdot Y_1 + p + m_G)\}^n] \cdot k_G$$

$$b = [k_0 + w_d \cdot Y_1 + w_s \{\cos(k_3 \cdot Y_1 + p + m_B)\}^n] \cdot k_B \qquad (12)$$

where $k_R$, $k_G$, and $k_B$ are parameters that represent colors of reflected light. With the parameters $k_R$, $k_G$, and $k_B$, the color of the substance can be designated to, for example, gold, silver, or copper. In other words, as shown in FIG. 11, the parameters $k_R$, $k_G$, and $k_B$ corresponding to individual modes are provided. For example, in a "gold" mode, the parameters $k_R$, $k_G$, and $k_B$ are designated to 1.0, 0.8, and 0.0, respectively. Thus, a substance with a color of gold can be displayed.

The parameter p and the parameters $m_R$, $m_G$, and $m_B$ are parameters of which the coefficient $k_4$ in Equation (11) is divided into two portions. The difference between the parameter p and the parameters $m_R$, $m_G$, and $m_B$ is that the parameter p is a common parameter of three-primary color signals R, G, and B and that the parameters $m_R$, $M_G$, and $m_B$ are parameters corresponding to the three-primary color signals R, G, and B, respectively. In other words, in Equation (12), the coefficient $k_4$ of Equation (11) is divided into the parameter p with respect to the direction (angle) of the light source and the parameters $m_R$, $m_G$, and $m_B$ with respect to colors (R, G, and B), respectively.

The parameter p is a parameter for shifting the cosine curve. When the parameter p is varied, the peak of the cosine curve shown in FIG. 9B is shifted. When the peak of the cosine curve is shifted to the left, the radiation angle $\theta$ of the light source shown in FIG. 9A increases. In other words, the parameter p is a parameter for determining the incident angle of the light source.

Figure 12A:
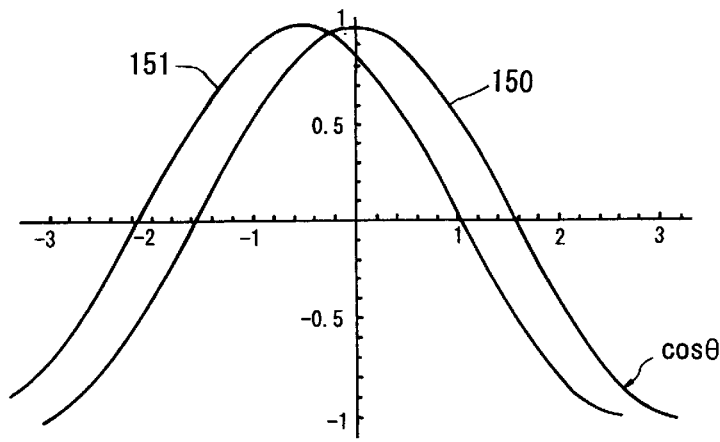
FIG. 12 is a schematic diagram for explaining parameters.
Figure 12B:
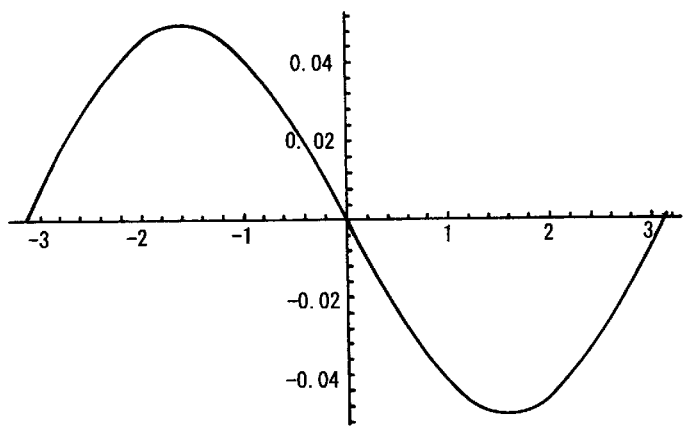

The parameters $m_R$, $m_G$, and $m_B$ are parameters for designating offset values. FIG. 12A is a graph showing the state of which the parameter $m_B$ is designated so that only the B signal is offset against the other signals R and G signals. In FIG. 12A, reference numeral 150 represents cosine curves of the R and G signals. Reference numeral 151 represents a cosine curve of the B signal. FIG. 12B shows the difference between the curves 150 and 151. The difference between the two curves 150 and 151 is almost zero in the vicinity of the peak value. However, as the curve is apart from the peak, the difference becomes large. In other words, in the vicinity of the peak, the color deviation of the B signal against the R and G signals is small. As the curve is apart from the peak, the color deviation of the B signal against the R and G signals becomes large.

The parameters $m_R$, $m_G$, and $m_B$ of the offset values are designated so as to more naturally display colors of metallic lusters. For example, to more naturally display a silver luster, the phase of the B signal is shifted against the phases of the R and G signals. Thus, since the color deviations of R, G, and B signals are small at a high brightness portion, a whitish silver color is obtained. As the brightness decreases, the color deviation of the B signal against the R and G signals becomes large and thereby a bluish silver color is obtained. When the phase of the B signal is deviated against the phases of the R and G signals, a more natural silver luster can be displayed. Likewise, to more naturally display a copper luster, the phase of the R signal is deviated against the phases of the G and B signals.

The value of the parameter n is designated to an even value except for 1. In the case that n is 1, 2, 4, or 6 (namely, $\cos \theta$, $(\cos \theta)^2$, $(\cos \theta)^4$, or $(\cos \theta)^6$), the distribution of mirror-surface reflection is as shown in FIG. 13. As shown in FIG. 13, with the parameter n, the spread of the reflected light of the mirror-surface reflection can be designated. In other words, with the parameter n, the ratio of the component of reflected light in other than the direction of the regular reflection can be designated.

As described above, in the image converting apparatus according to the present invention, because calculations corresponding to Equation (12) are performed, an input image is converted into an image with a metallic luster. These are the parameters in Equation (12):

$k_0$: ratio of reflection of background light
$W_d$: coefficient of diffusion reflection light
$w_s$: coefficient of mirror-surface reflection
$k_3$: number of light sources of mirror-surface reflection
p: incident angle of light source
n: degree of spread of reflected light of mirror-surface reflection
$k_R$, $k_G$, and $k_B$: parameters that represents colors of reflected light, and
$m_R$, $m_G$, and $m_B$: Parameters for color offsets that allow a metallic luster to be more naturally displayed.

FIG. 14 is a block diagram showing an example of an image converting apparatus according to the present invention. In this example, the image converting apparatus performs calculations corresponding to Equation (12) and generates an image with a metallic luster. A luminous signal $Y_0$ and color difference signals $U_0$ and $V_0$ are supplied to input terminals 1A, 1B, and 1C, respectively. The luminous signal $Y_0$ is supplied to a pre-modifying circuit 2 and a key processor 3. A controller 4 supplies a clip level CLIP, a gain level GAIN, and an offset level OFFSET to the pre-modifying circuit 2. An output signal of the pre-modifying circuit 2 is supplied to a color correction circuit 5.

Figure 15:
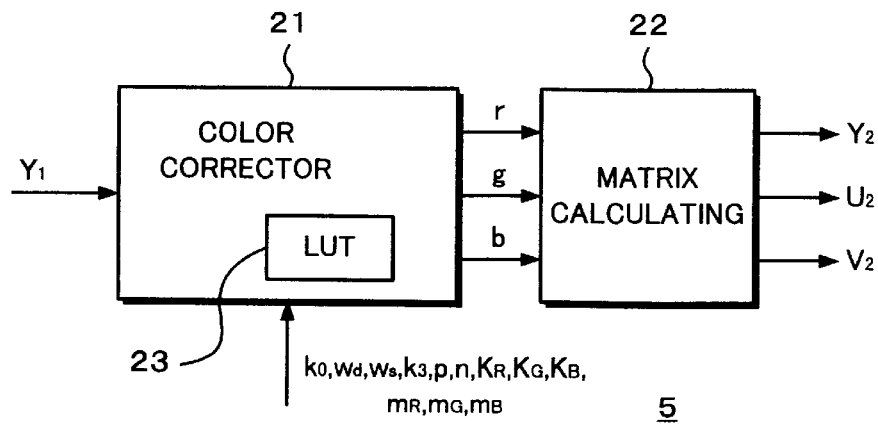
FIG. 15 is a block diagram showing an example of a color correction circuit of the image converting apparatus according to the present invention.

As shown in FIG. 15, the color correction circuit 5 has a color corrector 21 and a matrix calculating circuit 22. The color corrector 21 has a look-up table (LUT) 23 that stores an algorithm with which the above-described calculations corresponding to Equation (12) are performed. The controller 4 supplies parameters ($k_0$, $w_d$, $w_s$, $k_3$, p, n, $k_R$, $k_G$, $k_B$, $m_R$, $m_G$, and $m_B$) to the color correction circuit 5. The look-up table 23 is a ROM that stores the parameters ($k_0$, $w_d$, $w_s$, $k_3$, p, n, $k_R$, $k_G$, $k_B$, $m_R$, $m_G$, and $m_B$) and calculated results corresponding to the brightness data $Y_1$. When the parameters ($k_0$, $w_d$, $w_s$, $k_3$, p, n, $k_R$, $k_G$, $k_B$, $m_R$, $m_G$, and $m_B$) and the brightness data $Y_1$ are input to addresses of the look-up table 23, calculated results corresponding to Equation (1) are output.

With the luminous signal $Y_1$ received from the pre-modifying circuit 2 and the parameters ($k_0$, $w_d$, $w_s$, $k_3$, p, n, $k_R$, $k_G$, $k_B$, $m_R$, $m_G$, and $m_B$), the color correction circuit 5 performs calculations corresponding to Equation (12) using the look-up table 23. The resultant three-primary color signals r, g, and b are supplied to the matrix calculating circuit 22 which generates a component signal composed of the luminous signal $Y_2$ and the color difference signals $U_2$ and $V_2$ with the three-primary color signals r, g, and b.

The pre-modifying circuit 2 shown in FIG. 14 designates the clip, gain, and offset so as to obtain an optimum metallic effect. The pre-modifying circuit 2 adjusts the clip, gain, and offset and designates an optimum dynamic range so as to obtain an optimum metallic effect with the look-up table 23.

The color correction circuit 5 supplies the luminous signal $Y_2$ and the color difference signals $U_2$ and $V_2$ to mix circuits 6, 7, and 8, respectively. In addition, a luminous signal $Y_0$ and color difference signals $U_0$ and $V_0$ are supplied from input terminals 1A, 1B, and 1C to the mix circuits 6, 7, and 8, respectively.

The key processor 3 outputs a signal to control a switch circuit 9. An output signal of the switch circuit 9 is supplied to the mix circuits 6, 7, and 8. A key signal K1 that is a predetermined mix ratio and a key signal that is output from the key processor 3 are supplied to separate terminals of 9B and 9A, respectively of the switch circuit 9. The switch circuit 9 selects either the mix ratio that is output from the key processor 3 or the predetermined mix ratio. When the switch circuit 9 is connected to a terminal 9A, the key signal that is output from the key processor 3 is selected. When the switch circuit 9 is connected to a terminal 9B, the key signal K1 with the predetermined mix ratio is selected.

The key processor 3 processes an input luminous signal and generates a key signal K when the level of the luminous signal exceeds a predetermined value and the edge level of the luminous signal exceeds a predetermined value. When the switch circuit 9 is connected to the terminal 9A, the mix ratio K is designated corresponding to the key signal received from the key processor 3. Thus, only a bright portion can be processed.

Figure 16:
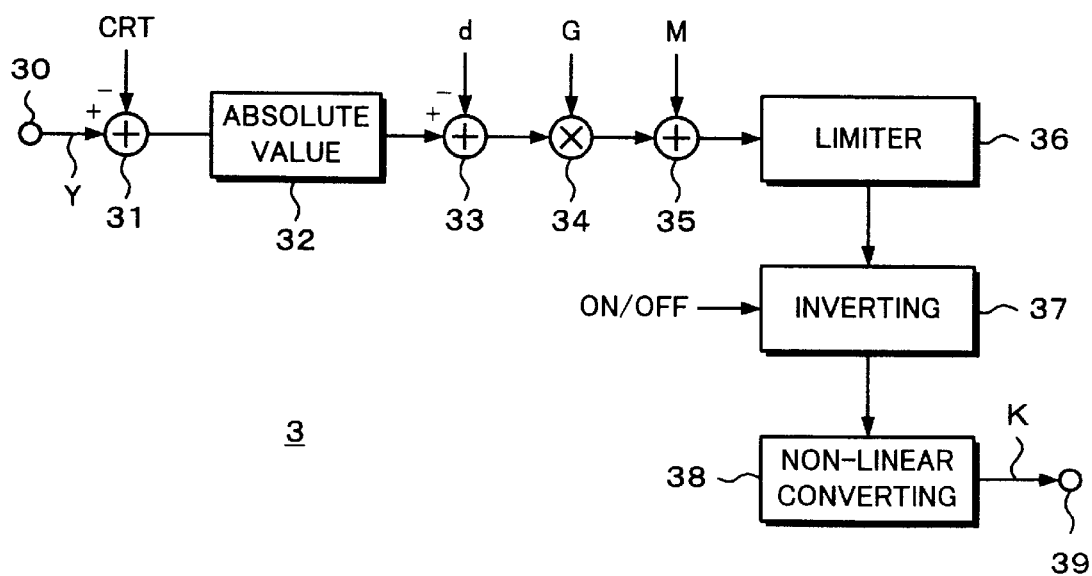
FIG. 16 is a block diagram showing an example of a key processor of the image converting apparatus according to the present invention.

The key processor 3 is structured as shown in FIG. 16. In FIG. 16, a luminous signal $Y_0$ received from an input terminal 30 and a designated value CRT that represents a desired level designated by the user are supplied to a subtracting circuit 31. The subtracting circuit 31 subtracts the luminous signal received from the input terminal 30 from the designated value CRT that represents the desired level designated by the user. An output signal of the subtracting circuit 31 is supplied to an absolute value calculating circuit 32. An output signal of the absolute value calculating circuit 32 is supplied to a subtracting circuit 33 and subtracted from the output from the absolute value circuit 32. A signal that represents a range d of the level to be processed is supplied to the subtracting circuit 33. An output signal of the subtracting circuit 33 is supplied to a gain adjusting circuit (i.e., a multiplier circuit) 34. A gain G is supplied to the gain adjusting circuit 34. An output signal of the gain adjusting circuit 34 is supplied to an adding circuit 35 where a mix ratio M is added to it. An output signal of the adding circuit 35 is supplied to a non-linear converting circuit 38 through a limiter 36 and an inverting circuit 37. An output signal of the non-linear converting circuit 38 is obtained from an output terminal 39.

In the structure shown in FIG. 16, the desired level to be processed is designated with the level CRT supplied to the subtracting circuit 31. When the level of the luminous signal received from the input terminal 30 exceeds the level CRT, the subtracting circuit 31 outputs a signal. The absolute value of the output signal of the subtracting circuit 31 is obtained by the absolute value calculating circuit 32. The output signal of the absolute value calculating circuit 32 is supplied to the subtracting circuit 33. The subtracting circuit 33 designates the range d of the level to be processed. The gain adjusting circuit 34 designates the gain corresponding to an output signal of the subtracting circuit 33. The mix ratio is designated corresponding to the mix ratio M supplied to the adding circuit 35. The output signal of the adding circuit 35 is supplied to the non-linear converting circuit 38 through the limiter 36 and the inverting circuit 37. The limiter 36 limits the output signal to the range of the mix ratio. The inverting circuit 37 inverts a portion to be processed and the other portion not to be processed. The non-linear converting circuit 38 converts the distribution of the signal level corresponding to a predetermined non-linear conversion curve. The output signal of the non-linear converting circuit 38 is obtained from the output terminal 39. Thus, when the brightness level exceeds the predetermined value, the key signal with the predetermined mix ratio is obtained from the output terminal 39.

In FIG. 14, the luminous signal $Y_0$ and the color difference signals $U_0$ and $V_0$ received from the input terminals 1A, 1B, and 1C, respectively, and the luminous signal $Y_2$ and the color difference signals $U_2$ and $V_2$ received from the color correction circuit 5 are mixed at a determined mix ratio by the mix circuits 6, 7, and 8, respectively. The mix ratio is designated corresponding to the key signal received from the switch circuit 9. Assuming that the mix ratio is represented by K, the mix circuits 6, 7, and 8 output luminous signal $Y_{OUT}$ and color difference signals $U_{OUT}$ and $V_{OUT}$ from output terminals 11, 12, and 13, respectively, where:

$$Y_{out}=(Y_2-Y_0)K+Y_0 \quad U_{out}=(U_2-U_0)K+U_0 \quad V_{out}=(V_2-V_0)K+V_0 \quad (13)$$

With the above-described structure, the luminous signal $Y_0$ and color difference signals $U_0$ and $V_0$ received from the input terminals 1A, 1B, and 1C, respectively, are supplied to the color correction circuit 5 through the pre-modifying circuit 2. The color correction circuit 5 converts colors with calculations represented by terminals (10) and outputs the resultant signal through the mix circuits 6, 7, and 8. Thus, an image of a video signal of a doll made of ceramics can be processed so as to display an image of a doll made of gold, silver, or copper.

In addition, by designating the parameters ($k_0$, $w_d$, $w_s$, $k_3$, p, n, $k_R$, $k_G$, $k_B$, $m_R$, $m_G$, and $m_B$) supplied from the controller 4 to the color correction circuit 5 corresponding to an input image, an image with an optimum metallic luster can be obtained on real time basis.

In the above-described example, the color corrector circuit 21 corresponding to formula (10) is composed of the look-up table 23, as explained in reference to FIG. 15. Alternatively, the look-up table may be included in the pre-modifying circuit 2.

Figure 17:
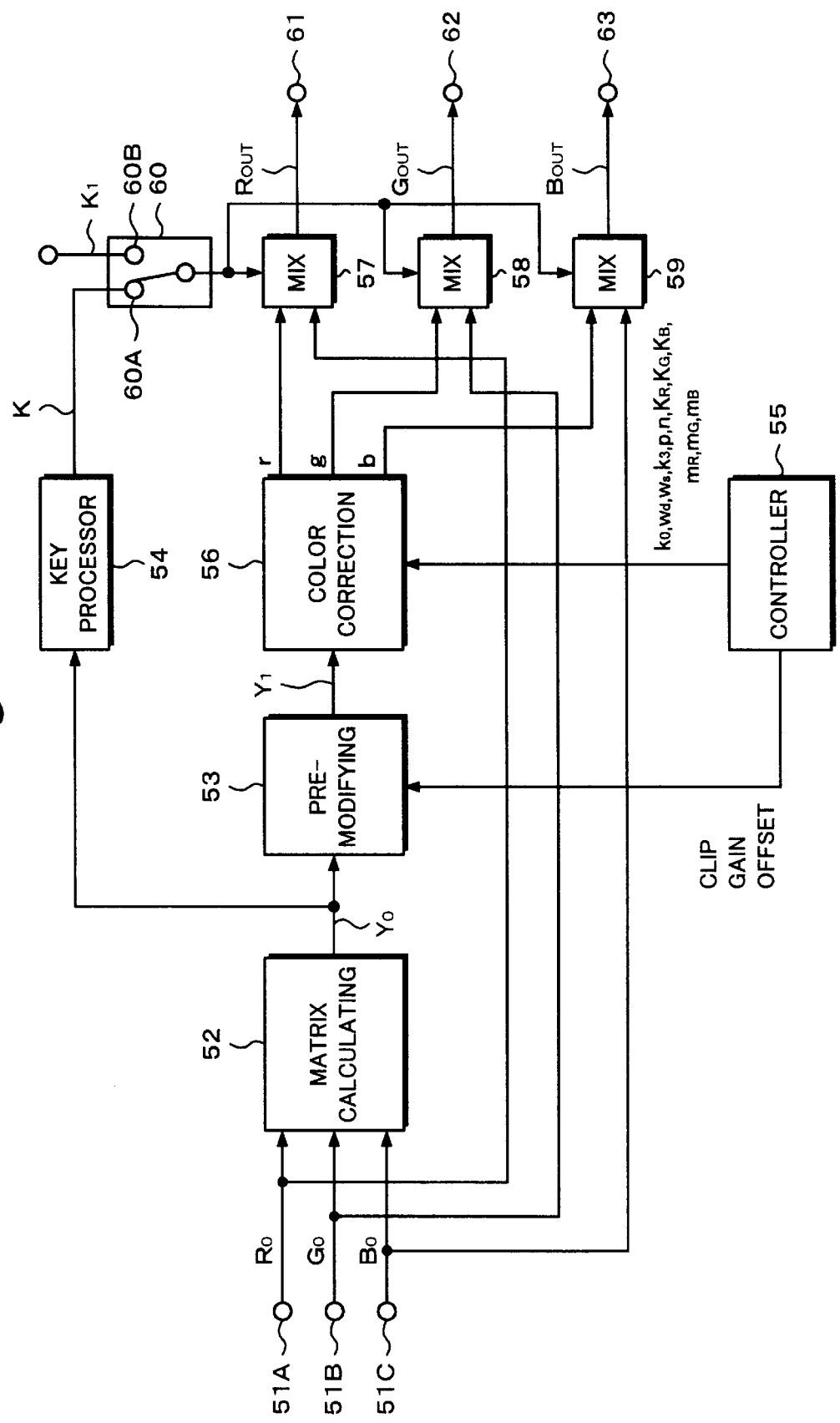
FIG. 17 is a block diagram showing another example of the image converting apparatus according to the present invention.

In the above-described example, the input video signal is a component video signal composed of the luminous signal Y and the color difference signals U and V. Alternatively, three-primary color video signals R, b, B may be input. FIG. 17 is a block diagram showing the structure in that case.

In FIG. 17, three-primary color signals $R_0$, $G_0$, and $B_0$ are supplied to input terminals 51A, 51B, and 51C, respectively. These three-primary color signals $R_0$, $G_0$, and $B_0$ are supplied to a matrix circuit 52. The matrix circuit 52 generates a luminous signal $Y_0$ with three-primary color signals R, G, and B. In other words, the matrix circuit 52 performs the following calculation.

$$Y_0=0.11R_0+0.30G_0+0.59B_0$$

Thus, the luminous signal $Y_0$ is generated with the three-primary color signals $R_0$, $G_0$, and $B_0$ and supplied to a pre-modifying circuit 53 and a key processor 54.

A controller 55 supplies a clip level CLIP, a gain level GAIN, and an offset level OFFSET to the pre-modifying circuit 53. An output signal $Y_1$ of the pre-modifying circuit 53 is supplied to a color correction circuit 56.

The color correction circuit 56 has a look-up table (similar to LUT 23) with which calculations corresponding to Equation (12) are performed. The controller 55 supplies parameters ($k_0$, $w_d$, $w_s$, $k_3$, p, n, $k_R$, $k_G$, $k_B$, $m_R$, $m_G$, and $m_B$) to the color correction circuit 56.

With the output signal $Y_1$ of the pre-modifying circuit 53 and the parameters ($k_0$, $w_d$, $w_s$, $k_3$, p, n, $k_R$, $k_G$, $k_B$, $m_R$, $m_G$, and $m_B$), the color correction circuit 56 performs the calculations corresponding to Equation (12) using the look-up table. The resultant three-primary color signals r, g, and b are supplied to mix circuits 57, 58, and 59, respectively.

An output signal of a switch circuit 60 is supplied to the mix circuits 57, 58, and 59. A key signal $K_1$ for designating a predetermined mix ratio and a key signal K received from the key processor 54 are supplied to the switch circuit 60. The switch circuit 60 selects the key signal K received from the key processor 54 or the key signal $K_1$ with the predetermined mix ratio.

The key processor 54 operates similarly to the key processor 3 and processes the input luminous signal and generates a key signal K. For example, when the level of the luminous signal exceeds a predetermined value or the edge level thereof exceeds a predetermined value, the key processor 54 outputs the key signal K. When the switch circuit 60 is connected to a terminal 60A, the key processor 54 designates the mix ratio corresponding to the key signal K. When the switch circuit 60 is connected to a terminal 60B, the key processor 54 designates the predetermined mix ratio $K_1$.

The mix circuits 57, 58, and 59 mix the three-primary color signals $R_0$, $G_0$, and $B_0$ received from input terminals 51A, 51B, and 51C with three-primary color signals r, g, and b received from the color correction circuit 56 at a mix ratio, supplied from the switch 60. Output signals of the mix circuits 57, 58, and 59 are supplied as three-primary color signals $R_{OUT}$, $G_{OUT}$, and $B_{OUT}$ from output terminals 61, 62, and 63, respectively.

Figure 18:
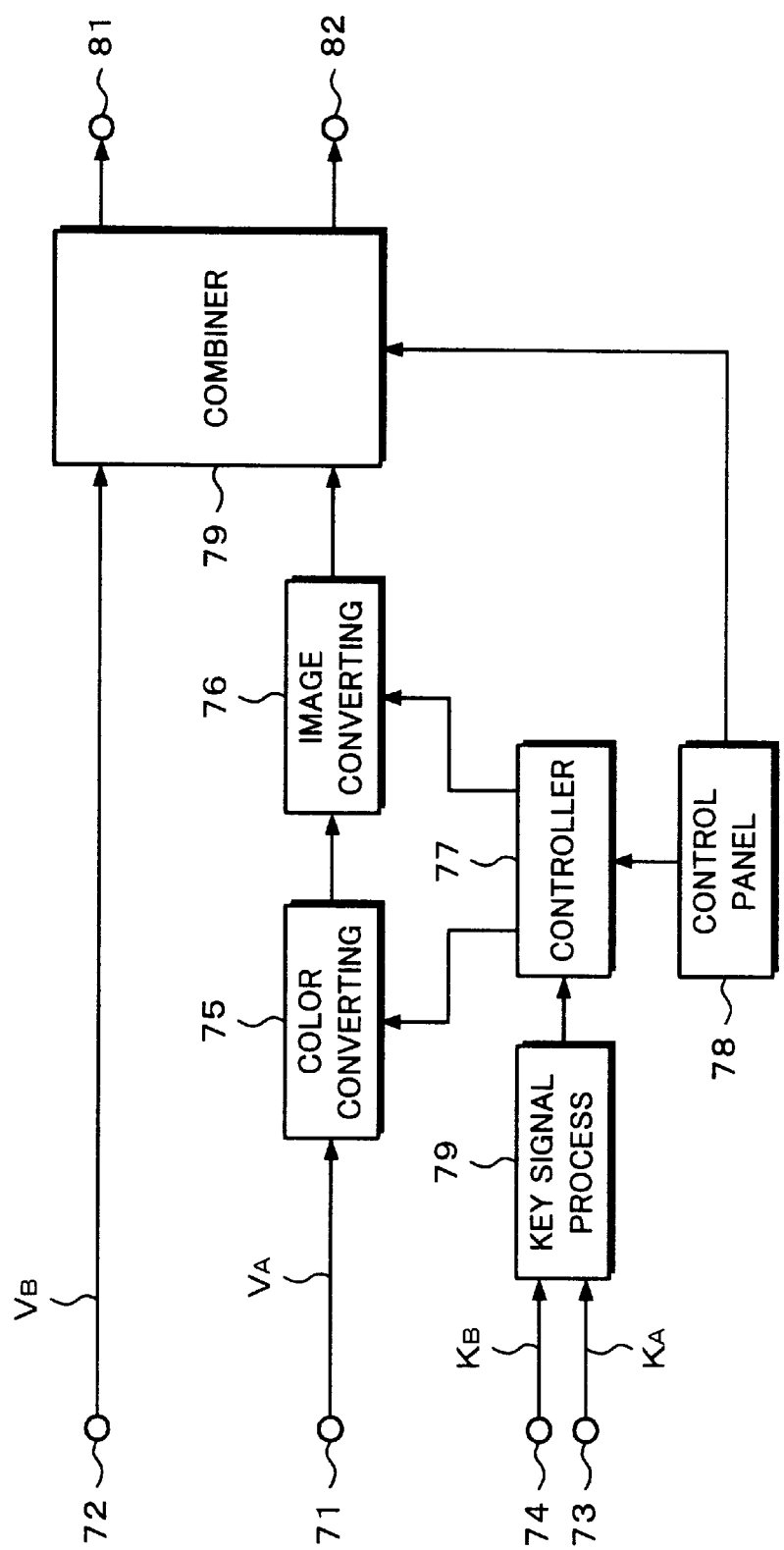
FIG. 18 is a block diagram showing an example of a special effect image editing system according to the present invention.

As described above, the image converting apparatus according to the present invention can convert an input video signal into an image with a metallic luster. Such an image converting apparatus can be disposed in a special effect image editing system. FIG. 18 is a block diagram showing an example of such a special effect image editing system according to the present invention. A video signal $V_A$ to be image-processed is supplied to an input terminal 71. A video signal $V_B$ is supplied as a background signal to an input terminal 72. Key signals $K_A$ and $K_B$ that designate positions of the video signals $V_A$ and $V_B$ on the screen are supplied to input terminals 73 and 74, respectively. The key signals $K_A$ and $K_B$ are supplied to a controller 77.

The video signal $V_A$ received from the input terminal 71 is supplied to a color converting circuit 75. The color converting circuit 75 performs a color converting process for the input video signal $V_A$. The color converting circuit 75 processes the input video signal with the structure shown in FIGS. 14 or 17 so as to generate an image with a metallic luster. In other words, when the input image is a doll made of ceramics, the image is processed so as to display an image of a doll made of gold or silver. The color converting circuit 75 can also invert the black and white of an image.

An output signal of the color converting circuit 75 is supplied to an image converting circuit 76. The image converting circuit 76 performs, for example, processes for enlarging an image, reducing an image, moving an image, and rotating an image. Such processes are performed by storing a video signal in a frame memory and controlling an address of the frame memory.

The color converting circuit 75 and the image converting circuit 76 are controlled by the controller 77. A signal is supplied from a control panel 78 to the controller 77. Corresponding to the input signal of the control panel 78, various parameters for the color converting circuit 75 and the image converting circuit 76 are generated. The parameters are supplied from the controller 77 to the color converting circuit 75 and the image converting circuit 76.

The color converting circuit 75 and the image converting circuit 76 perform various image processes for the input video signal $V_A$. The processed video signal is supplied to a combiner 79. The video signal $V_B$ is supplied from the input terminal 72 to the combiner 79. The combiner 79 combines the video signal $V_A$ that has been processed and received from the input terminal 71 with the video signal $V_B$ received from the input terminal 72 corresponding to a key signal. The combined video signal is obtained from an output terminal 81. In addition, a key signal is obtained from an output terminal 82.

According to the present invention, with brightness data of the input video signal and designated parameters, a circuit that converts the input video signal into an image with a metallic luster can be accomplished. With brightness data, a process for converting two-dimensional data into three-dimensional data is not required.

In addition, a circuit that performs such calculations is composed of a look-up table. Thus, the resultant circuit is simplified and operates at high speed. Moreover, with parameters, characteristics can be designated corresponding to a pattern on real time basis.

In addition, with a pre-modifying circuit disposed at an upstream stage from the circuit that performs such calculations, the dynamic range of the look-up table can be designated. In addition, with a key processor, a process for generating an image with a metallic luster can be performed when the brightness level exceeds a predetermined value.

Although the present invention has been shown and described with respect to preferred embodiments, various changes and modifications are deemed to lie within the spirit and scope of the invention as claimed.

What is claimed is:

1. An image converting apparatus for converting an input image represented by an input video signal into an output video signal representing an image with a metallic luster, comprising:

means for supplying designated parameters representing the metallic luster and corresponding to the input image;

a pre-modifying circuit supplied with a luminous signal component of the input video signal for adjusting the amplitude of the luminous signal component;

a color correction circuit supplied with the amplitude adjusted luminous signal component and the designated parameters for generating color corrected signals representative of a metallic luster, the color correction circuit including a look-up table with which calculations are performed;

mixing circuits for mixing the color corrected signals output from the color correction circuit with the input video signal according to a mix ratio to produce the output video signal representing an image with a metallic luster; and wherein the mixing circuits produce primary color output signals representing the input image with a metallic luster according to the formulae:

$R_{OUT}=(r-R_0)K+R_0$, $G_{OUT}=(g-G_0)K+G_0$, $B_{OUT}=(b-B_0)K+B_0$, where $R_{OUT}$, $G_{OUT}$, $B_{OUT}$ are the primary color output signals representing the input image with a metallic luster, r, g, b are the color corrected signals output from the color correction circuit, $R_0$, $G_0$, $B_0$ are primary color signals of the input video signal, and K is a mix ratio.

2. An image converting apparatus for converting an input image represented by an input video signal into an output video signal representing an image with a metallic luster, comprising:

means for supplying designated parameters representing the metallic luster and corresponding to the input image;

a pre-modifying circuit supplied with a luminous signal component of the input video signal for adjusting the amplitude of the luminous signal component;

a color correction circuit supplied with the amplitude adjusted luminous signal component and the designated parameters for generating color corrected signals representative of a metallic luster, the color correction circuit including a look-up table with which calculations are performed;

mixing circuits for mixing the color corrected signals output from the color correction circuit with the input video signal according to a mix ratio to produce the output video signal representing an image with a metallic luster; and wherein the color correction circuit generates output color corrected signals r, g, b representative of a metallic luster according to the formulae:

$r=[k_0+w_d \cdot Y_1+w_s\{\cos(k_3 \cdot Y_1+p+m_R)\}^n] \cdot k_R$ $g=[k_0+w_d \cdot Y_1+w_s\{\cos(k_3 \cdot Y_1+p+m_G)\}^n] \cdot k_G$ $b=[k_0+w_d \cdot Y_1+w_s\{\cos(k_3 \cdot Y_1+p+m_B)\}^n] \cdot k_B$, where $Y_1$ is the value of the luminous signal component and $k_0$, $w_d$, $w_s$, $k_3$, p, n, $k_R$, $k_G$, $k_B$, $m_R$, $m_G$, and $m_B$ are the designated parameters, and, in particular:

$k_0$ is a ratio of reflection of background light, $w_d$ is a coefficient of diffusion reflection light, $w_s$ is a coefficient of mirror-surface reflection, $k_3$ is a number of light sources of mirror-surface reflections, p is an incident angle of a light source causing the reflection, n is a degree of spread of reflected light of a mirror-surface reflection, $k_R$, $k_G$, and $k_B$ are parameters that represent colors of reflected light, and $m_R$, $m_G$, and $m_B$ are parameters for color offsets that allow a metallic luster to be more naturally displayed.

3. An image converting apparatus for converting an input image represented by an input video signal into an output video signal representing an image with a metallic luster according to claim 2, wherein the values of r, g, b according to the formulae for given designated parameters are stored in the look-up table.

4. An image converting apparatus for converting an input image represented by an input video signal into an output video signal representing an image with a metallic luster according to claim 2, wherein the values of $k_R$, $k_G$, and $k_B$ are 1.0, 0.8 and 0.0, respectively, for a gold colored luster.

5. An image converting apparatus for converting an input image represented by an input video signal into an output video signal representing an image with a metallic luster according to claim 2, wherein the values of $k_R$, $k_G$, and $k_B$ are 0.8, 0.8 and 1.0, respectively, for a silver colored luster.

6. An image converting apparatus for converting an input image represented by an input video signal into an output video signal representing an image with a metallic luster according to claim 2, wherein the values of $k_R$, $k_G$, and $k_B$ are 0.5, 0.5 and 0.5, respectively, for a copper colored luster.

7. An image converting apparatus for converting an input image represented by an input video signal into an output video signal representing an image with a metallic luster comprising:

means for supplying designated parameters representing the metallic luster and corresponding to the input image;

a pre-modifying circuit supplied with a luminous signal component of the input video signal for adjusting the amplitude of the luminous signal component;

a color correction circuit supplied with the amplitude adjusted luminous signal component and the designated parameters for generating color corrected signals representative of a metallic luster, the color correction circuit including a look-up table with which calculations are performed;

mixing circuits for mixing the color corrected signals output from the color correction circuit with the input video signal according to a mix ratio to produce the output video signal representing an image with a metallic luster; and a key processor supplied with the luminous signal component for producing a key signal for controlling the mix ratio of the mixing circuits when the amplitude of the luminous signal component and an edge level of the luminous signal component each exceed predetermined values.

8. An image converting apparatus for converting an input image represented by an input video signal into an output video signal representing an image with a metallic luster according to claim 7, wherein the key processor comprises:

a first subtracting circuit for taking the difference of the luminance component and a signal having a value designated by a user of the apparatus to produce a first difference signal;

an absolute value circuit supplied with the first difference signal for outputting an absolute value of the first difference signal;

a second subtracting circuit for taking the difference of the absolute value of the first difference signal and a signal representing a range of the level to be processed to produce a second difference signal;

a gain adjusting circuit, having a gain determined by a user of the apparatus, is supplied with the second difference signal to produce a gain adjusted output signal;

an adding circuit for combining the gain adjusted output signal with a signal, supplied by the user of the apparatus, representing a value of a mix ratio;

a limiter circuit supplied with an output of the adding circuit for producing an output signal limited to be in the range of the mix ratio;

an inverting circuit supplied with an output from the limiter circuit for inverting a portion to be processed and another portion not to be processed; and a non-linear converting circuit supplied with an output of the inverting circuit for converting a distribution of the signal level thereof to correspond to a predetermined non-linear conversion curve and outputting the key signal.

9. An image converting method for converting an input image represented by an input video signal into an output video signal representing an image with a metallic luster, comprising the steps of:

supplying designated parameters representing the metallic luster and corresponding to the input image;

adjusting the amplitude of a luminous signal component of the input video signal;

with the amplitude adjusted luminous signal component and the designated parameters, generating by means of a color look-up table, color corrected signals representative of a metallic luster;

mixing the color corrected signals with the input video signal according to a mix ratio to produce the output video signal representing an image with a metallic luster; and wherein the mixing step produces primary color output signals representing the input image with a metallic luster according to the formulae:

$$R_{OUT}=(r-R_0)K+R_0,$$

$$G_{OUT}=(g-G_0)K+G_0,$$

$$B_{OUT}=(b-B_0)K+B_0,$$

where $R_{OUT}$, $G_{OUT}$, $B_{OUT}$ are the primary color output signals representing the input image with a metallic luster, r, g, b are the color corrected signals, $R_0$, $G_0$, $B_0$ are primary color signals of the input video signal, and K is a mix ratio.

10. An image converting method for converting an input image represented by an input video signal into an output video signal representing an image with a metallic luster, comprising the steps of:

supplying designated parameters representing the metallic luster and corresponding to the input image;

adjusting the amplitude of a luminous signal component of the input video signal;

with the amplitude adjusted luminous signal component and the designated parameters, generating by means of a color look-up table, color corrected signals representative of a metallic luster;

mixing the color corrected signals with the input video signal according to a mix ratio to produce the output video signal representing an image with a metallic luster; and wherein color correction step generates output color corrected signals r, g, b representative of a metallic luster according to the formulae:

$$r=[k_0+w_d\cdot Y_1+w_s\{\cos(k_3\cdot Y_1+p+m_R)\}^n]\cdot k_R$$

$$g=[k_0+w_d\cdot Y_1+w_s\{\cos(k_3\cdot Y_1+p+m_G)\}^n]\cdot k_G$$

$$b=[k_0+w_d\cdot Y_1+w_s\{\cos(k_3\cdot Y_1+p+m_B)\}^n]\cdot k_B,$$

where $Y_1$ is the value of the luminous signal component and $k_0$, $w_d$, $w_s$, $k_3$, p, n, $k_R$, $k_G$, $k_B$, $m_R$, $m_G$, and $m_B$ are the designated parameters, and, in particular:

$k_0$ is a ratio of reflection of background light, $w_d$ is a coefficient of diffusion reflection light, $w_s$ is a coefficient of mirror-surface reflection, $k_3$ is a number of light sources of mirror-surface reflections, p is an incident angle of a light source causing the reflection, n is a degree of spread of reflected light of a mirror-surface reflection, $k_R$, $k_G$, and $k_B$ are parameters that represent colors of reflected light, and $m_R$, $m_G$, and $m_B$ are parameters for color offsets that allow a metallic luster to be more naturally displayed.

11. An image converting method for converting an input image represented by an input video signal into an output video signal representing an image with a metallic luster according to claim 10, wherein the values of r, g, b according to the formulae for given designated parameters are stored in the look-up table.

12. An image converting method for converting an input image represented by an input video signal into an output video signal representing an image with a metallic luster according to claim 10, wherein the values of $k_R$, $k_G$, and $k_B$ are 1.0, 0.8 and 0.0, respectively, for a gold colored luster.

13. An image converting method for converting an input image represented by an input video signal into an output video signal representing an image with a metallic luster according to claim 10, wherein the values of $k_R$, $k_G$, and $k_B$ are 0.8, 0.8 and 1.0, respectively, for a silver colored luster.

14. An image converting method for converting an input image represented by an input video signal into an output video signal representing an image with a metallic luster according to claim 10, wherein the values of $k_R$, $k_G$, and $k_B$ are 0.5, 0.5 and 0.5, respectively, for a copper colored luster.

15. An image converting method for converting an input image represented by an input video signal into an output video signal representing an image with a metallic luster, comprising the steps of:

supplying designated parameters representing the metallic luster and corresponding to the input image;

adjusting the amplitude of a luminous signal component of the input video signal;

with the amplitude adjusted luminous signal component and the designated parameters, generating by means of a color look-up table, color corrected signals representative of a metallic luster;

mixing the color corrected signals with the input video signal according to a mix ratio to produce the output video signal representing an image with a metallic luster; and producing a key signal from the luminous signal component for controlling the mix ratio of the mixing circuits when the amplitude of the luminous signal component and an edge level of the luminous signal component each exceed predetermined values.

16. An image converting method for converting an input image represented by an input video signal into an output video signal representing an image with a metallic luster according to claim 15, wherein the key signal producing step comprises:

taking the difference of the luminance component and a signal having a value designated by a user of the method to produce a first difference signal;

outputting an absolute value of the first difference signal;

taking the difference of the absolute value of the first difference signal and a signal representing a range of the level to be processed to produce a second difference signal;

gain adjusting, with a gain determined by a user of the method, the second difference signal to produce a gain adjusted output signal;

combining the gain adjusted output signal with a signal, supplied by the user of the apparatus, representing a value of a mix ratio;

limiting an output of the combining step to be in the range of the mix ratio to produce a range limited signal;

inverting a portion of the range limited signal to be processed and another portion of the range limited signal which is not to be processed; and non-linear converting a signal resulting from the inverting step for converting a distribution of the signal level thereof to correspond to a predetermined non-linear conversion curve and outputting the result as the key signal.

17. An image converting apparatus for converting an input image represented by an input video signal into an output video signal representing an image with a metallic luster according to claim 2, wherein the mixing circuits produce primary color output signals representing the input image with a metallic luster according to the formulae:

$$R_{OUT}=(r-R_0)K+R_0,$$

$$G_{OUT}=(g-G_0)K+G_0,$$

$$B_{OUT}=(b-B_0)K+B_0,$$

where $R_{OUT}$, $G_{OUT}$, $B_{OUT}$ are the primary color output signals representing the input image with a metallic luster, r, g, b are the color corrected signals output from the color correction circuit, $R_0$, $G_0$, $B_0$ are primary color signals of the input video signal, and K is a mix ratio.

18. An image converting method for converting an input image represented by an input video signal into an output video signal representing an image with a metallic luster according to claim 10, wherein the mixing step produces primary color output signals representing the input image with a metallic luster according to the formulae:

$$R_{OUT}=(r-R_0)K+R_0,$$

$$G_{OUT}=(g-G_0)K+G_0,$$

$$B_{OUT}=(b-B_0)K+B_0,$$

where $R_{OUT}$, $G_{OUT}$, $B_{OUT}$ are the primary color output signals representing the input image with a metallic luster, r, g, b are the color corrected signals, $R_0$, $G_0$, $B_0$ are primary color signals of the input video signal, and K is a mix ratio.

* * * * *